United States Patent [19]

Wiercinski et al.

[11] Patent Number: 4,595,636

[45] Date of Patent: Jun. 17, 1986

[54] BITUMEN ADHESIVE COMPOSITION CONTAINING AN IONOMERIC ELASTOMER AND WATERPROOFING MEMBRANES COMPRISING SAME

[75] Inventors: Robert A. Wiercinski, Somerville; Stephen J. Whicher, Wakefield, both of Mass.

[73] Assignee: W. R. Grace & Co., Cambridge, Mass.

[21] Appl. No.: 724,000

[22] Filed: Apr. 17, 1985

[51] Int. Cl.$^4$ ............................................. B32B 11/00
[52] U.S. Cl. .................................... 428/489; 428/497; 428/521; 428/220; 524/62; 524/64; 524/68; 524/69
[58] Field of Search ................. 524/62, 64, 68, 69; 428/521, 489, 497, 220

[56] References Cited

U.S. PATENT DOCUMENTS

| | | | |
|---|---|---|---|
| 3,639,527 | 2/1972 | Brinkman et al. | 525/64 |
| 3,741,856 | 6/1973 | Hurst | 428/261 |
| 3,801,531 | 4/1974 | Berejka et al. | 160/33.4 |
| 3,836,511 | 9/1974 | Clark et al. | 260/79.3 |
| 3,867,247 | 2/1975 | Clark et al. | 161/88 |
| 3,900,102 | 8/1975 | Hurst | 428/189 |
| 4,370,432 | 1/1983 | Agarwal et al. | 524/216 |
| 4,371,640 | 2/1983 | Agarwal et al. | 524/66 |
| 4,371,641 | 2/1983 | Boyer et al. | 524/70 |
| 4,376,179 | 3/1983 | Agarwal et al. | 524/65 |
| 4,385,141 | 5/1983 | Agarwal et al. | 524/66 |
| 4,387,174 | 6/1983 | Lundberg et al. | 524/66 |
| 4,420,524 | 12/1983 | Gorgati | 428/110 |
| 4,524,156 | 6/1985 | Cogliano | 521/83 |

*Primary Examiner*—Melvyn I. Marquis
*Attorney, Agent, or Firm*—John J. Wasatonic; William L. Baker

[57] ABSTRACT

Bitumen-based pressure sensitive adhesive compositions are provided which comprise bitumen, oil, and an ionomeric elastomer. The adhesive compositions are useful as self adherent waterproofing layers, particularly in roofing applications. The use of the ionomeric elastomer permits formulation of the adhesive to have improved tack at the lower temperatures encountered in such application while maintaining desired flexibility, shear strength, and flow resistance.

Also provided are waterproofing membranes comprising the inventive adhesive compositions.

24 Claims, No Drawings

BITUMEN ADHESIVE COMPOSITION CONTAINING AN IONOMERIC ELASTOMER AND WATERPROOFING MEMBRANES COMPRISING SAME

BACKGROUND OF THE INVENTION

This invention relates to pressure sensitive adhesive compositions comprising bitumen, an ionomeric elastomer, and an oil. The invention also relates to self-adherable waterproofing membranes comprising the adhesive compositions of this invention.

Compositions containing a mixture or blend of a bitumen, oil, and certain rubbers (usually styrene-butadiene rubbers) have been used as pressure sensitive adhesives in waterproofing applications. (For the sake of easy reference and brevity, these bitumen-oil-rubber adhesives are referred to hereinafter simply as "bitumen-based adhesives".) Generally, the bitumen-based adhesives are capable of being formed into pressure sensitive adhesive layers which can be adhered to a substrate to provide a waterproofing covering. Although these layers can be self supporting and thus not require a permanently adhered support or carrier, the commercial products employing such layers generally have included a support layer to which one face of the pressure sensitive adhesive layer is adhered. Typical of the support layers which have been used are polymeric sheets, e.g. polyethylene, polypropylene, polyvinylchloride, polyvinylfluoride and polyethylene terephthalate sheets, and various woven or non-woven backings. Among the more preferred support layers are the biaxially oriented or oriented and cross-laminated polyolefin films disclosed in Canadian Pat. No. 1,008,738.

Membranes comprising a waterproofing adhesive layer of a bitumen-based adhesive have been widely used in roofing applications, i.e., as self adherable roofing membranes applied to a roofdeck substrate, as below grade waterproofing coverings, e.g., in waterproofing concrete foundations, plaza decks, bridge decks, and the like, and in pipe wrapping applications. The bitumen-based adhesive layer provides a fully adhered waterproof layer which is self sealing and provides excellent waterproofing protection, this being in addition to the waterproofing protection provided by any support layer which might be used.

Although the waterproofing roofing membranes comprising these adhesives have heretofore been capable of application to a substrate under a wide variety of conditions, it has generally been required that the temperature of the substrate to which the membrane or, more specifically, the adhesive layer is to be applied is at least about 40° F., more preferably at least about 50° F. This limitation is primarily due to an insufficient degree of adhesiveness or "tack" at temperatures below about 40° F. Thus, application of these membranes has been restricted on a seasonal basis in the more northern climates.

The tack of bitumen-based adhesives tends to increase as the proportion of rubber is decreased or as the proportion of oil is increased. However, as a practical matter, neither of these options has proven to be a satisfactory means of improving the low temperature tack of the adhesive. Lowering the rubber content to the degree necessary to attain a significant increase in low temperature tack has resulted in an unacceptable decrease in the cohesive strength of the adhesive. This, in turn, has adversely affected the shear strength and flow resistance of the adhesive, particularly at higher temperatures of use. In addition, decreasing the rubber content has generally had an adverse affect on the flexibility of the adhesive. This can be especially troublesome at lower temperatures of use, e.g., from the standpoint of having sufficient flexibility to permit satisfactory performance while adhered to a substrate at very low temperatures, e.g., about −20° F. or less, the adhesive layer having a greater tendency to crack due to embrittlement at these low temperatures.

Increasing the oil content to a degree sufficient to improve the low temperature tack to a significant degree also results in unacceptable decreases in the cohesive strength of the adhesive, thus creating much the same problems at high temperatures as are encountered in lowering the rubber content.

The above considerations are especially important in the case of bitumen-based adhesives intended for use in roofing membranes as opposed, for example, to below grade waterproofing applications. In general, roofing membranes are subjected to the fullest extremes of temperature for a given climate. At the low temperatures of the rooftop environment, e.g., down to −20 F., the maintenance of flexibility is important for minimizing embrittlement of the adhesive and resultant cracking due to foot traffic and other stresses to which the adhesive layer may be subjected. At the typical high temperatures of the rooftop environment, e.g., 140° F. or higher, maintenance of flow resistance and shear strength is important for preventing flow of the adhesive, e.g., on sloped roofs, and for preventing localized displacement of the adhesive, e.g., due to foot traffic or the weight of overlying ballast. Thus, the combination of low temperature flexibility and high temperature shear strength and flow resistance is particularly desirable in adhesives intended for use in roofing. In view of the adverse effect on these properties resulting from the aforementioned adjustments of oil and rubber content, such adjustments have proven to be particularly unsatisfactorily as a means of improving the low temperature tack of bitumen-based roofing adhesives.

SUMMARY OF THE INVENTION

The present invention is directed to improved bitumen-based pressure sensitive adhesive compositions comprising bitumen, oil, and an ionomeric elastomer. It has been found that these compositions can be formulated to provide significantly improved low temperature tack without undue adverse effect on the low temperature flexibility or high temperature shear strength or flow resistance of the adhesive. As a result, the compositions of this invention can be formulated not only to provide improved low temperature tack, but also to possess a high degree of flexibility at low temperatures and a high degree of shear strength and flow resistance at high temperatures. As such, these adhesives can be used to advantage as self-adherable waterproofing adhesive layers or membranes, particularly in roofing applications, and particularly in roofing applications where the membrane surface temperature can vary over relatively wide ranges, e.g., from about −20° F. up to about 180° F.

In a preferred embodiment, the adhesives of this invention comprise bitumen, about 10 to about 130 parts by weight of oil per 100 parts by weight of the bitumen, and about 1 to 50 parts, more preferably about 4 to 25 parts by weight, of an ionomeric elastomer per 100 parts by weight of the bitumen.

In a still further preferred embodiment of this invention, the bitumen which is used is a high softening point bitumen which also possesses a relatively high penetration at low temperature. Particularly preferred bitumens are those having a Ring and Ball softening point of at least about 175° F. (ASTM D-36) and a penetration at 40° F. of at least about 25 dmm. (ASTM D-5).

The present invention is further directed to waterproofing membranes comprising the adhesives of this invention. The membranes may comprise the adhesive as an integral, monolithic layer without a support per se, although it may include a reinforcement such as a scrim material partially or fully embedded in the adhesive layer. Preferably, the membranes comprise the adhesive layer and a support layer which is either directly adhered to the adhesive layer or indirectly adhered to the adhesive layer, e.g., through one or more intermediate layers.

DETAILED DESCRIPTION OF THE INVENTION

As used herein, the term "bitumen" is used in a broad context to refer to the solid or semi-solid residue obtained on the removal of the volatile components from crude oil, either by natural processes or distillation of the crude oil, inclusive of those materials which are commonly referred to "asphalts" (i.e., naturally occurring or manufacturing bitumen or asphalt). Further, for the sake of brevity and convenience, the term "bitumen" is meant also to refer to tars and pitches, these being at least bituminous materials if not "true" bitumens. In general, the adhesives of this invention will utilize the manufactured bitumens or asphalts obtained as crude oil distillation residues.

The present invention relates to pressure sensitive adhesive compositions comprising bitumen, oil, and an ionomeric elastomer. The ionomeric elastomer serves as a rubber component of this novel blend and, in effect, fully or partially replaces the conventional rubbers (usually styrene-butadiene copolymers) heretofore used. It has been found that ionomeric elastomers can be incorporated into these compositions in much lower proportional amounts than the previously used rubbers, thereby providing a significant improvement in the low temperature tack of the adhesive, and that the resultant adhesive composition can be modified, as necessary, to achieve desired low temperature flexibility or high temperature shear strength and flow resistance. Thus, depending on the use requirements, these desired physical properties may be obtained in the present adhesives simply by appropriate modification of the bitumen:oil:ionomeric elastomer ratio. For the more severe use requirements, such as use under the relatively extreme temperature variations encountered in roofing applications, the present compositions may be further modified to provide the desired physical properties and this may be effected, for example, through the use of a certain type of bitumen, oil, or ionomeric elastomer, or through the incorporation of various additives into the adhesive formulation.

In contrast to this ability to modify the compositions of this invention, which contain relatively low quantities of ionomeric elastomer, similar modification has not been possible with bitumen-based adhesives comprising styrene-butadiene copolymers as the principal rubber component, i.e., adhesives in which the styrene-butadiene rubber content has been adjusted to a correspondingly low level in order to improve low temperature tack have proven to be incapable of being so modified to provide satisfactory low temperature flexibility and high temperature, shear strength and flow resistance.

The compositions of this invention may comprise the bitumen, oil, and ionomeric elastomer in any suitable ratio, as necessary to provide a pressure sensitive adhesive having desired physical properties. Generally, the compositions of this invention comprise about 1 to 50, more preferably about 4 to 25 parts by weight of ionomeric elastomer per 100 parts by weight of bitumen and about 10 to 130, more preferably about 40 to 90, parts by weight of oil per 100 parts by weight of bitumen. Particularly preferred compositions are those comprising about 6 to 15 parts by weight of ionomeric elastomer per 100 parts by weight of bitumen and about 50 to 80 parts by weight of oil per 100 parts by weight of bitumen.

It is also preferred that the present compositions comprise less than about 15% by weight of the ionomeric elastomer, based on the total weight of the bitumen, oil, and elastomer. Generaly, an elastomer content below about 15% by weight is required for purposes of providing desired improvements in low temperature tack. An even more preferred level is less than about 10% by weight and generally the ionomeric elastomer is employed at weight concentration range of about 3% to 8%, based on the total weight of the bitumen, oil, and elastomer.

Bitumens are commonly classified by penetration grade (ASTM D-5) and Ring and Ball softening point (ASTM D-36). While any bitumen suitable to provide desired physical properties may be used in the present compositions, it is preferred to use bitumens which combine a relatively high penetration grade with a relatively high softening point. Particularly preferred bitumens of this invention combine a penetration of at least about 25 dmm. at 40° F., as measured according to the procedure set forth in ASTM D-5, with a Ring and Ball softening point of at least about 175° F., as measured according to the procedure set forth in ASTM D-36. Preferably the softening point of the bitumen is in the range of about 210° F. to 230° F. Unexpectedly, it has been found that these preferred bitumens can be used in conjunction with the ionomeric elastomers to provide bitumen-based adhesive compositions which have a high degree of flexibility at low temperatures. In particular, the use of these bitumens allows the formulation of adhesive compositions of this invention which have sufficient flexibility for use in roofing applications at temperatures as low as −20° F., thus minimizing the tendency of the adhesive layer to embrittle and crack when subjected to foot traffic or other stresses at such low temperatures. It should be recognized that the preferred bitumens are especially advantageous in this regard in that the ionomeric elastomer, when present in a reduced amount, is by itself generally not able to provide the desired flexibility.

The oil component of the present composition, as in all bitumen-oil-rubber adhesives, serves as a plasticizer for the bitumen, a processing aid, e.g., in facilitating dissolution of the rubber component or ionomeric elastomer in the bitumen, or as an bitumen modifier, e.g., to increase the tack of the bitumen. Any oil serving one or more of these functions may be employed in the present compositions and, in general, any of the various oils used in prior bitumen-based adhesives, commonly referred to as "extender oils", can be used in the present compositions. These oils are generally classified as either naphthenic, aromatic, or paraffinic, with the aromatic oils being preferred for use in this invention. An especially preferred aromatic oil is Sundex 790T, sold under that tradename by the Sun Oil Company.

It should be understood that bitumens may include a naturally occurring oil component and that this oil component can vary in type and amount as a function of the source of the bitumen and method of manufacture. The oil component of the present compositions is to be distinguished from these naturally occurring bitumen oils. Thus, the oil component of this invention is a separate additive oil or mixture of additive oils which is incorporated into the bitumen-based adhesive composition as part of its manufacture and provides one or more of the above described functions. Consistent with this, any quantities or proportions of oil presented herein refer to the quantity of this added ingredient oil only, and are thus exclusive of any naturally occurring oil contained in the bitumen. Similarly, any quantities or proportions of bitumen presented herein refer to the bitumen as manufactured or naturally occurring and thus are inclusive of any naturally occurring oil in the bitumen.

As used herein, the term "ionomeric elastomer" refers to any of the elastomeric polymers which contain ionic groups pendant to the polymer backbone and which can be crosslinked by ionic bonding between these groups. A matrix of an ionomeric elastomer will contain microphase-separated ionic domains formed by aggregation of the pendant ionic groups and it is within these ionic aggregates or domains that the ionic crosslinking is effected. Thus, the ionomeric elastomers contain at least the minimum amount of pendant ionic groups which is sufficient to permit the formation of these ionic aggregates in the pure polymer matrix. Normally, the ionomeric elastomers contain at least about 0.1 mole percent ionic groups, i.e., at least about 1 pendant ionic group per 1000 monomer repeat units, and preferably at least about 1 mole percent. The ionic groups should not, however, be present in amounts which make the polymer water soluble. Such amounts will vary depending on the nature of the polymer backbone and the particular ionic group or groups present. Normally, a satisfactory upper level of ionic group content is less than about 30 mole percent.

The ionomeric elastomers may comprise pendant carboxylic, sulfonic, or phosphonic acid groups. They are normally prepared by incorporating the acid group into an olefinically unsaturated elastomer with an acid group producing reactant or by copolymerization of nonionic monomers with ionic group containing monomers. Methods of preparation of ionomeric elastomers are disclosed, for example, in U.S. Pat. Nos. 3,642,728; 3,801,531; 3,867,247; 4,370,432; and 4,385,141.

The olefinically unsaturated elastomers from which the ionomeric polymers may vbe derived include butyl rubber, halogenated butyl rubber, ethylene-propylene-diene terpolymers, styrene-butadiene rubbers, polybutadiene, polyisoprene, natural rubber, and various other elastomers containing either high or low olefinic unsaturation.

After incorporation of an appropriate acid group or groups into the elastomer, the acid groups are at least partially neutralized with cations such as metal or amine cations to ionically crosslink the polymer. The metal ions are normally mono-, di- or trivalent ions of metals of Groups I, II, III, IV-A and VIII of the Periodic Table of Chemical Elements. Suitable monovalent metal cations include sodium, potassium, lithium, cesium, silver, mercury, and copper in its monovalent state. Divalent metal cations which are suitable include ions of berylium, magnesium, calcium, strontium, barium, cadmium, copper, mercury, tin, lead, iron, cobalt, nickel, zinc, and the like. Suitable trivalent metal cations include aluminum, iron, and the like. The preferred metals are zinc and the alkali metals. More than one metal ion can be employed in the formation of the neutralized ionomeric elastomer and combinations of metal ions may be preferred under certain applications.

The partially or completely neutralized sulfonated ionomeric elastomers are preferred for use in this invention. Particularly preferred are the partially or completely neutralized sulfonated ethylene-propylene-diene (EPDM) terpolymers, hereinafter referred to as "SEPDM" elastomers. SEPDM elastomers are derived by sulfonation of at least some of the olefinic unsaturation sites of elastomeric EPDM base polymers, e.g., in accordance with the preparative methods of U.S. Pat. Nos. 3,642,728 and 3,836,511, both of which are incorporated by reference herein.

With regard to the base polymer, the term "EPDM" is used herein in the sense of its definition as found in ASTM-D-1418-64 and is intended to mean a terpolymer containing ethylene and propylene in the backbone and a diene in the side chain. Illustrative methods for producing these polymers are found in U.S. Pat. No. 3,280,082; British Pat. No. 1,030,289 and French Pat. No. 1,386,600. The preferred EPDM polymers contain about 45 to about 80 weight percent ethylene and about 2 to about 10 weight percent of a diene monomer, the balance of the polymer being propylene. The diene monomer is preferably a non-conjugated diene. Illustrative of the nonconjugated diene monomers which may be used in the terpolymer EPDM are hexadiene, dicyclopentadiene, 5-ethylidene-2-norbornene, 5-methylene-2-norbornene, 5-propenyl-2-norbornene, and methyl tetrahydroindene. The base EPDM terpolymers useful in preparing the sulfonated ionomers usually have a number average molecular weight (Mn) as measured by GPC of about 10,000 to about 200,000 more preferably about 15,000 to about 100,000, for example, about 20,000 to about 60,000. The Mooney viscosity (ML, 1+8, 100° C.) of the EPDM terpolymer is usually about 5 to about 60, preferably about 10 to about 50, for example, about 15 to about 40. The Mv as measured by GPC of the EPDM terpolymer is preferably below about 350,000 and more preferably below about 300,000. The Mw as measured by GPC of the EPDM terpolymer is preferably below about 500,000 and more preferably below about 350,000. A typical EPDM commercially available is a terpolymer having a Mooney viscosity (ML, 1+8, 100° C.) of about 40 and having an ethylene content of about 40 weight percent and a 5-ethylidene-2-norbornene content of about 5.0 weight percent. The Mn of the commercial EPDM, as measured by GPC, is about 47,000, the Mv as measured by GPC is about 145,000 and the MW as measured by GPC is about 174,000.

The above described polymers are sulfonated in known manners such as by dissolving them in a nonreactive solvent followed by the addition of a sulfonating agent at temperatures normally from −100° C. to +100° C. The sulfonating agent can be any suitable sulfonating agent such as those described in U.S. Pat.

Nos. 3,042,728 and b 3,836,522, which are expressly incorporated by reference herein.

The resultant sulfonated EPDM typically contains 0.1 to about 20 mole percent SO$_3$H, preferably about 0.5 to about 15 mole percent. The desired range of sulfonation depends on the application and, in the preparation of the polymer for general purposes, is that amount or range which allows processing by extrusion or molding at suitable temperatures below the degradation temperature of the polymer. The desired sulfonation limit for such processability will increase as the molecular weight of the polymer decreases. Illustrative in this regard is U.S. Pat. No. 3,642,728 which teaches a preferred upper sulfonation level (SO$_3$H) for olefinically unsaturated polymers of about 3 mole percent for polymers having a number average molecular weight of about 250,000 and an upper limit of about 9 to 14 mole percent for polymers having a number average molecular weight of about 50,000.

The SEPDM elastomers may be neutralized with any of the metal ions specifically mentioned above but are preferably at least partially neutralized with zinc. It is preferred to utilize SEPDM elastomers in which at least 50% of the acid groups are neutralized, more preferably at least 90% of the acid groups. The most preferred SEPDM elastomers are those in which 95% to 100% of the acid groups are neutralized, most preferably with zinc.

The compositions of this invention may contain additional ingredients such as anti-oxidants or fillers, e.g., calcium carbonate. As disclosed in copending application Ser. No. 723,995, filed of even data, a preferred material for addition to the present compositions is the naturally occurring asphaltite mineral gilsonite. In accordance with the disclosure of that copending application, it has been found that the incorporation of small quantities of gilsonite into the compositions of this invention, e.g., 0.5 to 10 parts by weight per 100 parts by weight of bitumen, provides significant increases in the high temperature shear strength. Moreover, at these low concentrations the increased shear strength can be obtained while maintaining the low temperature flexibility of the composition. A discussion of gilsonite mineral and its properties and uses is provided in Kirk Othmer, Encyclopedia of Chemical Technology, 3rd Ed., Vol. 11, p. 802, which is incorporated herein by reference.

The compositions of this invention may be prepared by blending the bitumen, oil, and ionomeric elastomer and any additional ingredients in various types of mixers at temperatures in the range of about 280° F. to 350° F. Preferably, the ionomeric elastomer and oil are first heated and stirred to provide a homogeneous mix, generally for a period of about 1 to 3 hours, any additional materials, e.g., gilsonite or fillers, are then added and allowed to become evenly distributed throughout the mix, and the bitumen is then added. The total composition is then maintained within the above temperature range and stirred until a homogeneous mix is obtained, with a typical mixing time after completion of bitumen addition generally being less than one half hour.

This invention is further directed to waterproofing membranes comprising the adhesive compositions of this invention. In one form, such membranes are comprised of an integral, monolithic layer of the adhesive without a support per se, although it may include reinforcing means such as woven or non-woven scrim material or reinforcing fibers partially or fully embedded in the adhesive layer. The adhesive layer preferably has a thickness of at least about 0.01 in. in order to provide satisfactory waterproofing protection. For ease of handling during transport and application, one or both faces of the adhesive membrane may have a covering layer or sheet releasably adhered thereto, with siliconized paper or plastic being a particularly well known and preferred covering. After application to a substrate, the remaining face of the adhesive membrane, which may be exposed by removal of any releasable covering, may be used to adhere or key a covering material, such as a protective layer of finely divided aggregate or a cladding material, e.g., as described in U.S. Pat. No. 3,900,102, the disclosure of which is incorporated by reference herein.

Preferably, the membranes of this invention comprise the adhesive layer and a non-removable support layer which is either directly adhered to the adhesive layer, i.e., the support and adhesive layers are contacted and adhered to one another, or indirectly adhered to the adhesive layer, i.e., one or more intermediate layers are positioned between the support and adhesive layers and the membrane is an integral laminate of all of these layers. The support may be a continuous sheet or film of a woven or non-woven scrim or fabric. it may be comprised of inorganic materials, e.g., continuous sheets of a metal foil or a woven or non-woven glass scrim, or organic materials such as natural rubber or synthetic organic polymers. In general, continuous synthetic organic polymer sheets are the preferred support layers. The synthetic polymers which can be used to form these sheets include polyethylene, polypropylene or other polyolefins, polyamides, polyesters, polyurethanes, polyvinylchloride, polyvinylfluoride and synthetic rubbers such as polychloroprene or butyl rubber. The polymer sheet may be biaxially oriented or oriented and cross-laminated, e.g., as disclosed in Canadian Pat. No. 1,008,738, and, in particular, high density polyethylene sheets of this type are preferred.

In general, it is desired to have optimum weatherability characteristics in the support layer. The support may be rendered opaque, for example, by the incorporation of a material such as carbon black. Protective coatings and films may be applied in the factory or in the field to those surfaces of the support which are to be exposed to the weather. Moreover, the support may be a single sheet of pre-formed film or it may comprise a plurality of layers, not necessarily identical, laminated together to form a unitary structure. The continuous sheet materials are preferred insofar as they may provide a waterproofing and vapor barrier function in addition to that provided by the adhesive layer.

The support layer of the present membranes will generally have a thickness in the range of about 0.001 in. to about 0.05 in., more preferably about 0.002 in. to about 0.02 in. The bitumen-based adhesive layer should be at least 0.01 in. thick and preferably has a thickness in the range of about 0.02 in. to 0.1 in.

The membranes of this invention which comprise a support in addition to the adhesive may also include a releasable covering on that face of the adhesive layer remote from the support, e.g., as disclosed in U.S. Pat. No. 3,900,102. As noted above, the siliconized papers and polymer films are generally used.

The membranes of this invention may be applied in accordance with procedures well known in the art. Thus, for example, the adhesive layer is applied against the substrate as the releasable covering is removed more or less simultaneously to expose the face of the layer. For a continuous waterproofing course, the membranes are generally applied in overlapping fashion. In order to provide adhesive to adhesive contact and prevent the formation of channels which allow water flow at the overlap joint, the membranes may be fabricated with the adhesive layer protruding beyond at least one longitudinal edge of the support layer, e.g., as disclosed in U.S. Pat. No. 3,900,102.

The membranes of this invention can be prepared by known techniques. Thus, the adhesive may be heated to a temperature which is sufficient to provide desired viscosity and flow for application to the desired substrate (either the support or the releasable covering sheet) and applied thereto in a uniform layer utilizing a suitable coating device. If desired, a reinforcing material may be pressed into the hot adhesive. Any remaining layers are then applied to the exposed adhesive layer, and it may prove desirable to permit the adhesive layer to cool prior to such application, depending on the temperature sensitivity of the remaining layers which are to be applied.

The present invention is further described by the following Examples which are illustrative only and not intended to be of limiting effect. In the following Examples, all proportions are in parts by weight unless otherwise specified.

EXAMPLE 1

A series of adhesive compositions of this invention was prepared utilizing the components and proportions shown in Table b 1. The bitumen used in each composition had a Ring and Ball softening point of about 225° F. (ASTM D-36) and a penetration at 40° F. of about 36 dmm. (ASTM D-5). The bitumen was a commercially available sample supplied by Trumbull Asphalt Co., Summit, Ill. under the designation "4033 Asphalt". The oil was an aromatic oil sold by Sun Oil Company under the trademark Sundex 790T. The ionomeric elastomer was a 100% zinc neutralized sulfonated EPDM comprising, as the diene monomer, 5-ethylidene-2-norbornene. This elastomer had an average molecular weight of aout 50,000 and a degree of sulfonation of 13SO$_3$- groups per molecule.

TABLE 1

| Adhesive Composition | Bitumen | Oil | SEPDM | CaCO$_3$[1] |
|---|---|---|---|---|
| 1 | 58 | 40 | 8 | 10 |
| 2 | 58 | 34 | 8 | 10 |
| 3 | 62 | 34 | 4 | 10 |
| 4 | 56 | 40 | 4 | 10 |
| 5 | 57 | 37 | 6 | 10 |
| 5A | 57 | 37 | 6 | 10 |
| 6 | 55 | 37 | 8 | 10 |
| 7 | 60 | 34 | 6 | 10 |
| 8 | 59 | 37 | 4 | 10 |
| 8A | 59 | 37 | 4 | 10 |

TABLE 1-continued

| Adhesive Composition | Bitumen | Oil | SEPDM | CaCO$_3$[1] |
|---|---|---|---|---|
| 9 | 54 | 40 | 6 | 10 |

[1] Calcium carbonate added as a filler.

Each of the above formulations was prepared by mixing the oil and SEPDM at room temperature and allowing the mix to stand for at least one hour. The mix was then charged to a sigma blade mixer and blended for 30 minutes at about 300° F. The calcium carbonate was then added and blending continued for about 15 minutes. The bitumen was then added and blending continued for an additional 15 minutes, yielding a smooth, homogeneous mix.

To prepare samples for testing of peel strengths and shear strengths, approximately 30 grams of an adhesive sample were compressed between a sheet of siliconized release paper and a composite sheet of aluminum and polyethylene at 150° F., with the aluminum side facing the adhesive. The resultant adhesive layer had a thickness of about 0.05 inches. The siliconized paper was then removed and a sheet of polyvinyl fluoride pressed against the exposed adhesive to prepare laminate samples. For each sample, the lamination of the polyvinyl fluoride sheet to the adhesive was conducted at the temperature at which the peel strength and shear strength were to be measured and the sample was maintained at that temperature prior to testing.

The average peel strengths were measured on an Instron Model 1000 using 1 inch wide samples. The samples were pulled at a 180° angle (T-peel) at the rates indicated by Table 2. Maximum lap shear strengths were also measured on the Instron Model 1000. One inch square laminate samples were tested at 77° F. and 140° F.

For testing of low temperature flexibility, the adhesive was compressed onto the aluminum-polyethylene composite as above, the releasable paper removed, and the resultant composite cooled to −25° F. for 24 hours. The sample was then manually bent completely around a ¼ inch mandrel and examined visually for cracking in the adhesive layer. Five such samples were tested for each adhesive formulation. The ratio of the number of samples which did not crack out of the five tested is also presented in Table 2.

For comparison with a conventional bitumen-based adhesive, similar samples were prepared as above using a pressure sensitive adhesive containing 51.2 parts of a 150° F. softening point asphalt, 26.9 parts of an aromatic oil, 5.7 parts of calcium carbonate, and 16.2 parts of a styrene butadiene rubber commonly used in commercial adhesive formulations. This comparison sample is designated as sample 10 in Table 2. In Table 2, the sample numbers otherwise correspond to the adhesive composition numbers of Table 1.

TABLE 2

| | Avg. T-Peel Strength (lbs/in) | | | | Max. Lap Shear Strengths (lbs/sq in) | | Flex/Fail Rate |
|---|---|---|---|---|---|---|---|
| Sample No. | 25° F.[1] | 40° F.[1] | 77° F.[2] | 140° F.[2] | 77° F.[3] | 140° F.[3] | −25° F. |
| 1 | 9.7 | 6.6 | 0.39 | 0.16 | 1.93 | 0.27 | 5/5 |
| 2 | 6.2 | 6.5 | 0.53 | 0.16 | 2.64 | 0.34 | 5/5 |
| 3 | 12.2 | 9.9 | 0.28 | 0.10 | 1.14 | 0.07 | 3/5 |
| 4 | 13.8 | 9.5 | 0.24 | 0.08 | 0.69 | 0.05 | 2/5 |
| 5 | 11.4 | 13.5 | 0.37 | 0.11 | 1.68 | 0.18 | 5/5 |
| 5A | 10.4 | 10.1 | 0.47 | 0.12 | 1.51 | 0.16 | 5/5 |
| 6 | 5.7 | 6.8 | 0.43 | 0.17 | 1.96 | 0.23 | 5/5 |
| 7 | 8.3 | 9.0 | 0.54 | 0.07 | 1.52 | 0.15 | 5/5 |

TABLE 2-continued

| Sample No. | Avg. T-Peel Strength (lbs/in) | | | | Max. Lap Shear Strengths (lbs/sq in) | | Flex/Fail Rate −25° F. |
|---|---|---|---|---|---|---|---|
| | 25° F.[1] | 40° F.[1] | 77° F.[2] | 140° F.[2] | 77° F.[3] | 140° F.[3] | |
| 8 | 14.0 | 10.4 | 0.39 | 0.06 | 0.86 | 0.07 | 3/5 |
| 8A | 15.2 | 9.7 | 0.33 | 0.07 | 0.86 | 0.09 | 2/5 |
| 9 | 13.8 | 11.9 | 0.42 | 0.09 | 1.17 | 0.13 | 5/5 |
| 10 | 0.9 | 8.2 | 0.74 | — | 3.13 | 0.18 | 5/5 |

[1]Average for 3 samples pulled at 2 in./min.
[2]One sample pulled at 0.005 in./min.
[3]One sample pulled at 0.005 in./min.

The results of Table 2 evidence a substantial improvement in the tack of the adhesive at 25° F., as compared to the conventional formulation, and comparable tack at the higher temperature. The samples displayed good to excellent flexibility. Although the shear strengths were lower than that of the conventional adhesive, these compositions may be optimized to provide comparable shear strengths, as illustrated by Example 4 herein.

EXAMPLE 2

Five compositions of this invention were prepared which differed only in the type of bitumen which was used. Each composition contained 7.0 parts of the neutralized SEPDM of Example 1, 34.4 parts of Sundex 790T oil, 0.07 parts of calcium stearate, and 58.5 parts of bitumen. The compositions were prepared by the procedure of Example 1, with the calcium stearate being added at the same stage of preparation as the calcium carbonate of Example 1. In relevant part, the bitumens differed in terms of their penetration at 40° F. and their Ring and Ball softening point. Table 3 indicates these properties for each bitumen. The T-peel strength, flex/fail performance, and high temperature shear strength of each of the adhesive compositions were determined by the procedures described in Example 1 and are presented in Table 3.

TABLE 3

| Adhesive Composition | Bitumen Properties | | Adhesive T-Peel Strength (lbs/in.) | | Flex/Fail at −25° F. | Lap Shear Strength (lbs/sq in) 140° F. at 0.005 in./min. |
|---|---|---|---|---|---|---|
| | 40° F. pen[1] (dmm.) | Softening[2] Point (°F.) | 25° F. at 2 in./min. | 40° F. at 2 in./min. | | |
| 11 | 85 | 120 | 20.0 | 20.0 | 0/5 | .02 |
| 12 | 35 | 145 | 18.3 | 20.3 | 0/5 | .02 |
| 13 | 16 | 154 | 1.0 | 20.7 | 0/5 | .06 |
| 14 | 18 | 182 | 1.0 | 16.8 | 0/5 | .14 |
| 15 | 36 | 225 | 10.0 | 12.8 | 4/5 | .15 |

[1]200 gram weight for 60 seconds
[2]ASTM D-36

The data of Table 3 shows composition 15, containing a bitumen with both a high 40° F. penetration and a high softening point, to have the best overall combination of low temperature peel strength, low temperature flexibility, and high temperature shear strength. It is of interest to note that although the bitumen of formulation 11 had a higher 40° F. penetration than that of composition 15 and that the penetration of the bitumen of formulation 12 was about equal, neither composition 11 or 12 provided a comparable level of low temperature flexibility. In addition, while the 182° F. softening point bitumen of composition 14 provided a good high temperature shear strength, it had a relatively low penetration and also did not provide a degree of flexibility comparable to that of composition 15.

EXAMPLE 3

In order to demonstrate the effect of varying the adhesive component proportions and the bitumen type on the low temperature flexibility, seven adhesive compositions of the invention were prepared using the components and proportions set forth in Table 4. The formulations were prepared using the SEPDM and 790T oil of Example 1. The preparative procedure of Example 1 was again used, with the exception of omitting the calcium carbonate addition in preparing formulations 20–22. The flex/fail performance of the resultant compositions was determined by the procedure described in Example 1.

TABLE 4

| Adhesive Composition | Bitumen Properties | | Proportions (parts by weight) | | | | Flex/Fail | |
|---|---|---|---|---|---|---|---|---|
| | 40° F. pen[1] (dmm) | Softening[2] Point (°F.) | Bitumen | SEPDM | Oil | CaCO$_3$ | Temp (°F.) | Pass Ratio |
| 16 | 36 | 225 | 51.8 | 5.4 | 33.6 | 9.1 | −20 | 4/5 |
| 17 | 36 | 225 | 46.4 | 4.5 | 34.7 | 10 | −25 | 2/6 |
| 18 | 18 | 182 | 52.1 | 5.0 | 33.8 | 9.1 | −20 | 0/5 |
| 19 | 18 | 182 | 59.7 | 7.5 | 32.9 | 8.9 | −20 | 0/5 |
| 20 | 16 | 154 | 63.4 | 5.0 | 31.6 | — | −20 | 0/5 |
| 21 | 16 | 154 | 61.1 | 7.5 | 30.8 | — | −20 | 0/5 |
| 22 | 16 | 154 | 60.0 | 10.0 | 30.0 | — | −20 | 5/5 |

[1]200 gram weight for 60 seconds
[2]ASTM D-36

It may be noted that while the relatively high loading of elastomer in composition 22 provided a high level of flexibility, this composition also had the lowest degree of low temperature tack.

EXAMPLE 4

A series of adhesive compositions of this invention was prepared using the components and proportions set forth in Table 5. The bitumen, SEPDM, and aromatic oil were the same as used in Example 1 as was the preparative procedure. A pulverized, naturally occurring gilsonite ("American Gilsonite Selects" grade), obtained from the American Gilsonite Company, Salt Lake City, Utah, was added to certain of the compositions to determine the effect of this material on the high temperature shear strength of the adhesive. Laminate samples were prepared as in Example 1 and lap shear strengths at 77° F. and 140° F. were determined by the same procedures used in Example 1. The measured lap shear strengths are presented in Table 5.

TABLE 5

| Adhesive Composition | SEPDM | Bitumen | Oil | CaCO₃ | Gilsonite | Lap Shear Strength (lbs./Sq. in.) 0.005 in./min. | |
|---|---|---|---|---|---|---|---|
| | | | | | | 77° F. | 140° F. |
| 23 | 4.5 | 48.6 | 34.65 | 10.0 | 2.25 | — | .37 |
| 24 | 4.5 | 50.85 | 34.65 | 10.0 | 0 | — | .05 |
| 25 | 5.34 | 50.80 | 32.98 | 8.91 | 1.96 | — | .30 |
| 26 | 5.45 | 51.82 | 33.64 | 9.09 | 0 | — | .12 |
| 27 | 5.4 | 42.3 | 33.3 | 10.0 | 9 | — | .9 |
| 28 | 4.5 | 48.6 | 34.65 | 10.0 | 2.25 | 1.45 | .24 |
| 29 | 5.4 | 51.3 | 33.3 | 9.0 | 1.0 | 2.7 | .43 |
| 30 | 5.4 | 51.3 | 33.3 | 9.0 | 0 | 0.32 | 0.02 |
| 31 | 5.4 | 51.3 | 33.3 | 9.0 | 1.0 | — | 0.31 |
| 32 | 5.4 | 51.3 | 33.3 | 9.0 | 2.0 | 2.83 | 0.31 |

The data of Table 5 illustrates the pronounced affect of relatively small quantities of gilsonite in increasing the shear strength of the present compositions at both of the temperatures of testing.

EXAMPLE 5

An adhesive composition was prepared as in Example 1 containing 5.4 parts of the SEPDM of Example 1, 32 parts of Sundex 790T oil, 50 parts of the 225° F. softening point bitumen of Example 1, and 9 parts of calcium carbonate. This composition was divided into four portions to which were added, respectively, 1, 2, 3.8, and 5.7 parts of the gilsonite of Example 5. Flex/fail testing was conducted as described in Example 1 using six laminate samples for each of the resultant compositions. The results were as shown in Table 6.

TABLE 6

| Gilsonite Concentration | Flex/Fail at −20° F. |
|---|---|
| 1 | 6/6 |
| 2 | 5/6 |
| 3.8 | 5/6 |
| 5.7 | 0/6 |

The date of Table 6 illustrates that the relatively low concentrations of gilsonite which provide substantial increases in high temperature shear strengths will generally not have a significant adverse affect on the low temperature flexibility.

What is claimed is:

1. A pressure sensitive adhesive composition comprising bitumen, an oil which is not naturally occurring in said bitumen and is selected from the group consisting of naphthenic oils, paraffinic oils, and aromatic oils, and an ionomeric elastomer.

2. A composition of claim 1 wherein said bitumen has a softening point of at least about 175° F. and a penetration at 40° F. of at least about 25 dmm.

3. A composition of claim 2 wherein said bitumen has a softening point in the range of about 210° F. to about 230° F.

4. A composition of claim 1 wherein said oil is an aromatic oil.

5. A composition of claim 1 wherein said ionomeric elastomer is a partially or completely neutralized sulfonated ionomeric elastomer.

6. A composition of claim 1 wherein said ionomeric elastomer is a partially or completely neutralized sulfonated ethylene-propylene-diene terpolymer.

7. A composition of claim 6 wherein at least 90% of the acid groups of said terpolymer are neutralized.

8. A composition of claim 7 wherein 95% to 100% of the acid groups of said terpolymer are neutralized with zinc.

9. A composition of claim 1 comprising about 1 to 50 parts by weight of said ionomeric elastomer per 100 parts by weight of said bitumen and about 10 to 130 parts by weight of said oil per 100 parts by weight of said bitumen.

10. A composition of claim 9 comprising about 4 to 25 parts by weight of said ionomeric elastomer per 100 parts by weight of said bitumen and about 40 to 90 parts by weight of said oil per 100 parts by weight of said bitumen.

11. A composition of claim 10 comprising about 6 to 15 parts by weight of said ionomeric elastomer per 100 parts by weight of said bitumen and about 50 to 80 parts by weight of said oil per 100 parts by weight of said bitumen.

12. A composition of claim 1 comprising less than about 15% by weight of said ionomeric elastomer, based on the total weight of said bitumen, oil, and elastomer.

13. A composition of claim 1 comprising less than about 10% by weight of said ionomeric elastomer, based on the total weight of said bitumen, oil, and elastomer.

14. A composition of claim 1 comprising about 3% to 8% of said ionomeric elastomer, based on the total weight of said bitumen, oil, and elastomer.

15. A composition of claim 14 wherein said ionomeric elastomer is a sulfonated ethylene-propylene-diene terpolymer in which 95% to 100% of the acid groups of said terpolymer are neutralized with zinc.

16. A composition of claim 15 in which said bitumen has a softening point of at least about 175° F. and a penetration at 40° F. of at least about 25 dmm.

17. A pressure sensitive adhesive composition comprising bitumen, about 4 to 25 parts by weight of elastomeric neutralized sulfonated ethylene-propylene-diene terpolymer per 100 parts by weight of said bitumen, and about 40 to 90 parts by weight of an oil which is not naturally occurring in said bitumen per 100 parts by weight of said bitumen, said oil being selected from the group consisting of naphthenic oils, paraffinic oils, and aromatic oils, said bitumen having a softening point of at least about 175° F. and a penetration at 40° F. of at least about 30 dmm.

18. A composition of claim 17 comprising about 6 to 15 parts by weight of said terpolymer per 100 parts by weight of said bitumen and about 80 to 100 parts by weight of said oil per 100 parts by weight of said bitumen.

19. A composition of claim 17 wherein 95% to 100% of the acid groups of said terpolymer are neutralized with zinc.

20. A composition of claim 17 comprising about 3% to 8% by weight of said terpolymer, based on the total weight of said bitumen, oil, and terpolymer.

21. A waterproofing membrane comprising a waterproofing layer of a pressure sensitive adhesive composition comprising bitumen, an oil which is not naturally occurring in said bitumen and is selected from the group consisting of naphthenic oils, paraffinic oils, and aromatic oils, and an ionomeric elastomer.

22. A membrane of claim 21 further comprising a support layer directly or indirectly adhered to said pressure sensitive adhesive layer.

23. A membrane of claim 22 wherein said support layer comprises a a woven or non-woven scrim or a continuous sheet of a synthetic organic polymer.

24. A membrane of claim 21 wherein said pressure sensitive adhesive layer has a thickness of at least 0.01 inches.

* * * * *